June 30, 1942.  A. G. HATCH ET AL  2,288,161
METHOD OF AND APPARATUS FOR FORMING FIBER CAN BODIES
Filed July 21, 1938  9 Sheets-Sheet 1
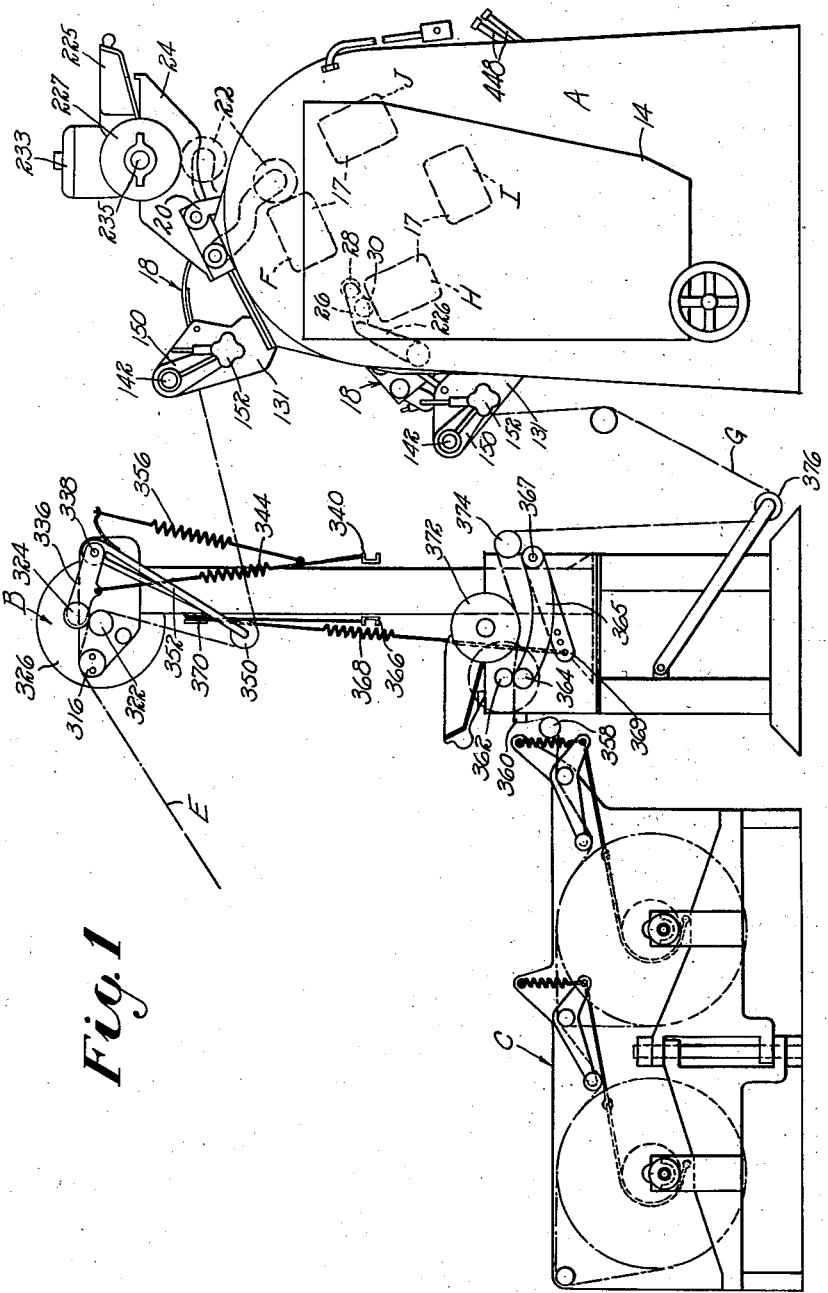
Inventor
ALEXANDER G. HATCH
ROBERT S. CONDON
By *R. Clay Lindsey*
Attorney

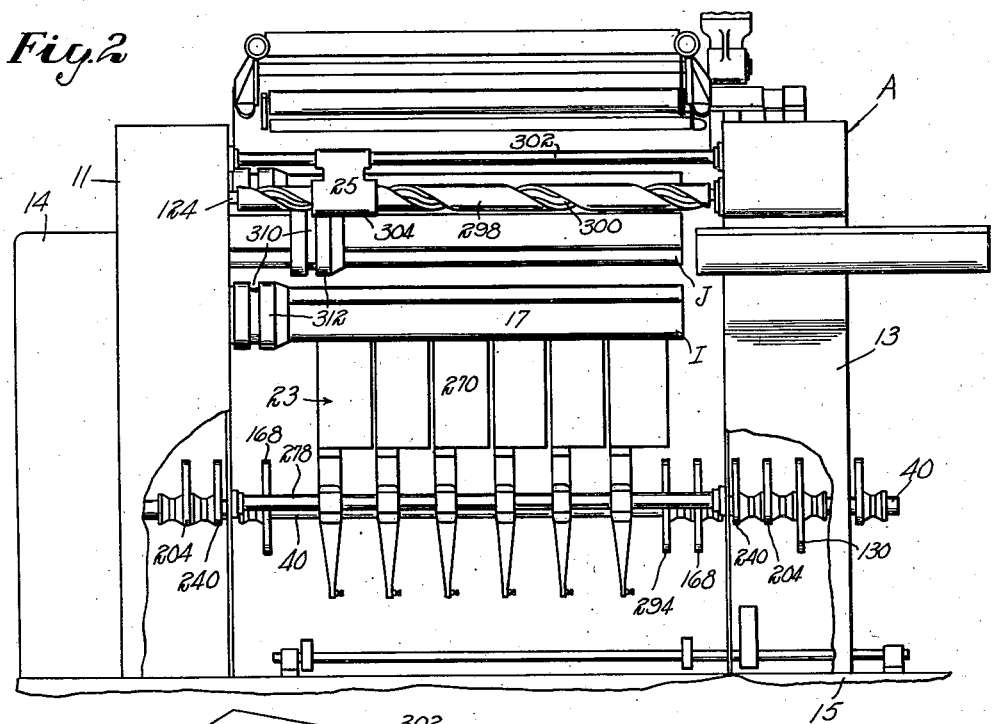
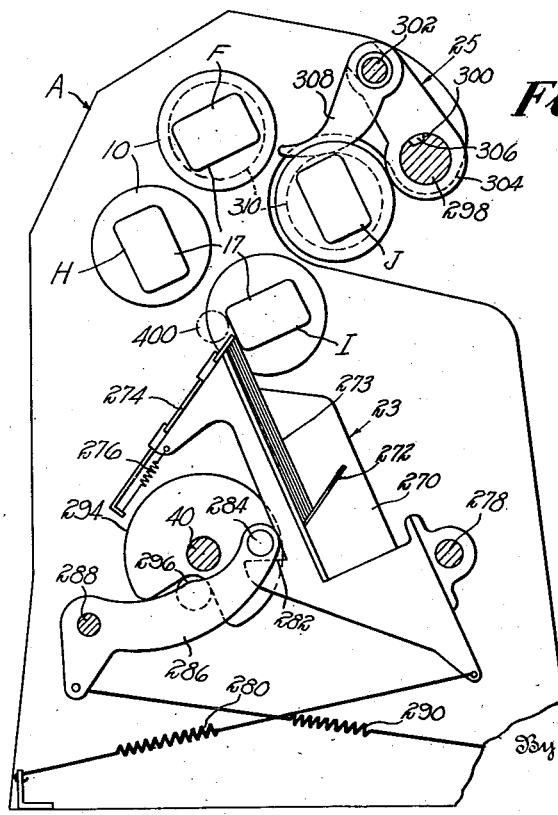

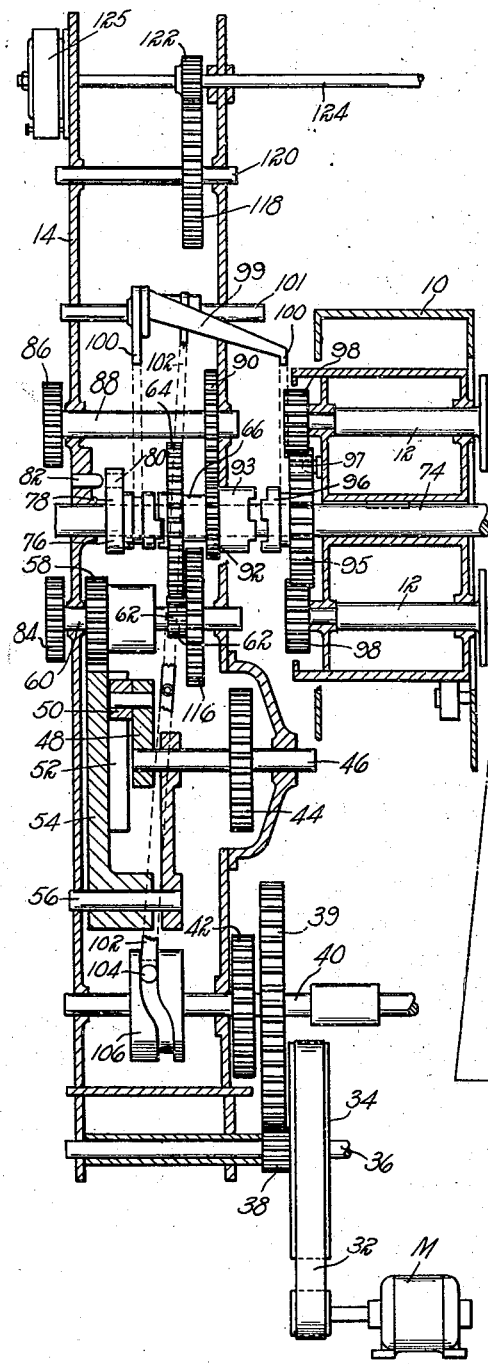
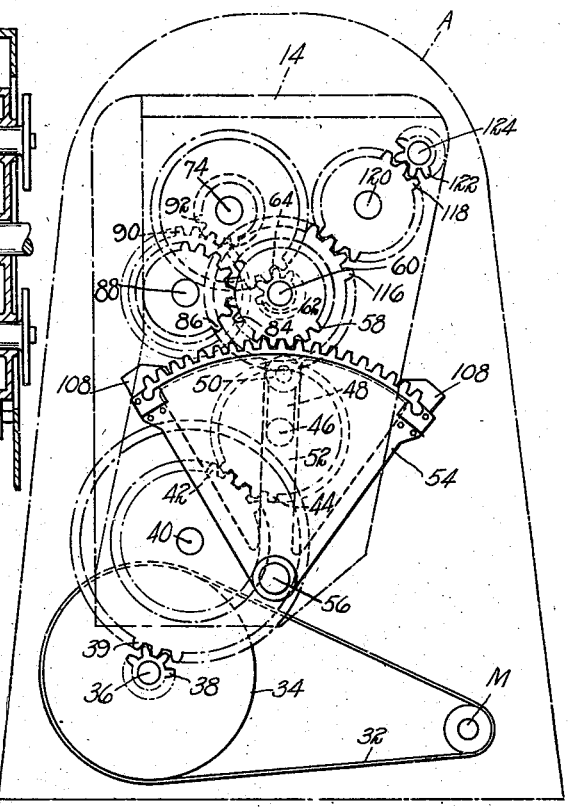
Fig. 4
Fig. 3
Inventor
ALEXANDER G. HATCH
ROBERT S. CONDON
By W. Clay Lindsey
Attorney Inventor
ALEXANDER G. HATCH
ROBERT S. CONDON
By N. Clay Lindsey.
Attorney June 30, 1942.  A. G. HATCH ET AL  2,288,161
METHOD OF AND APPARATUS FOR FORMING FIBER CAN BODIES
Filed July 21, 1938   9 Sheets-Sheet 5

Inventor
ALEXANDER G. HATCH
ROBERT S. CONDON
By *H. Clay Lindsey*
Attorney

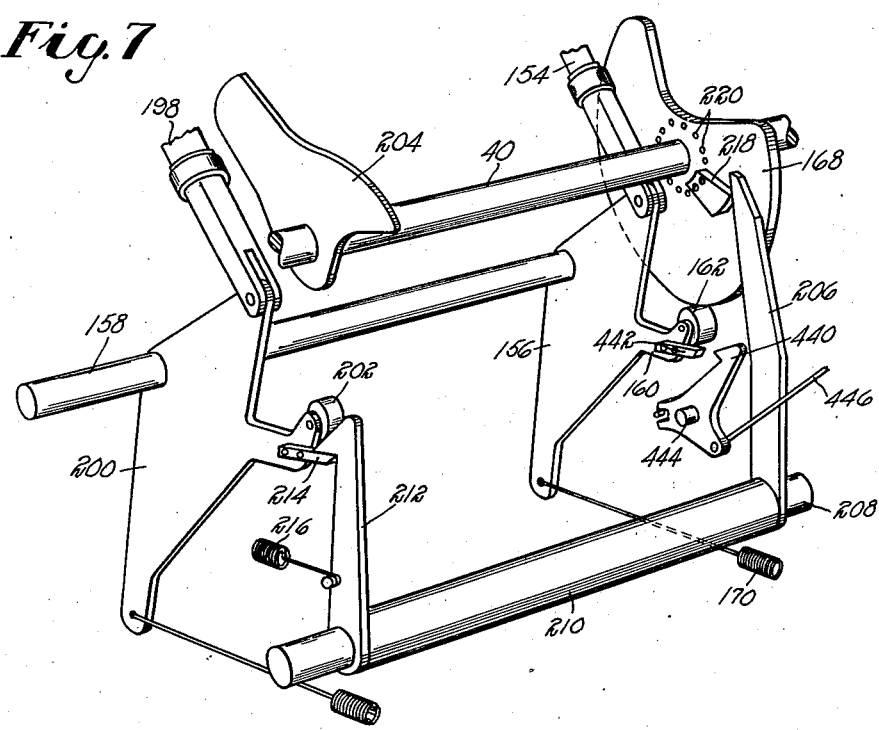
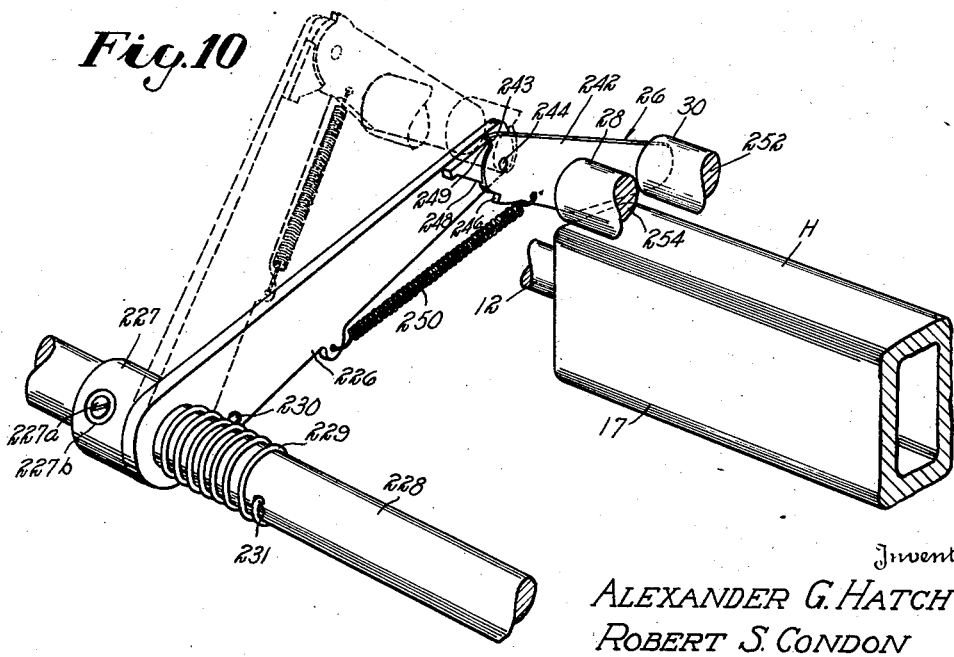

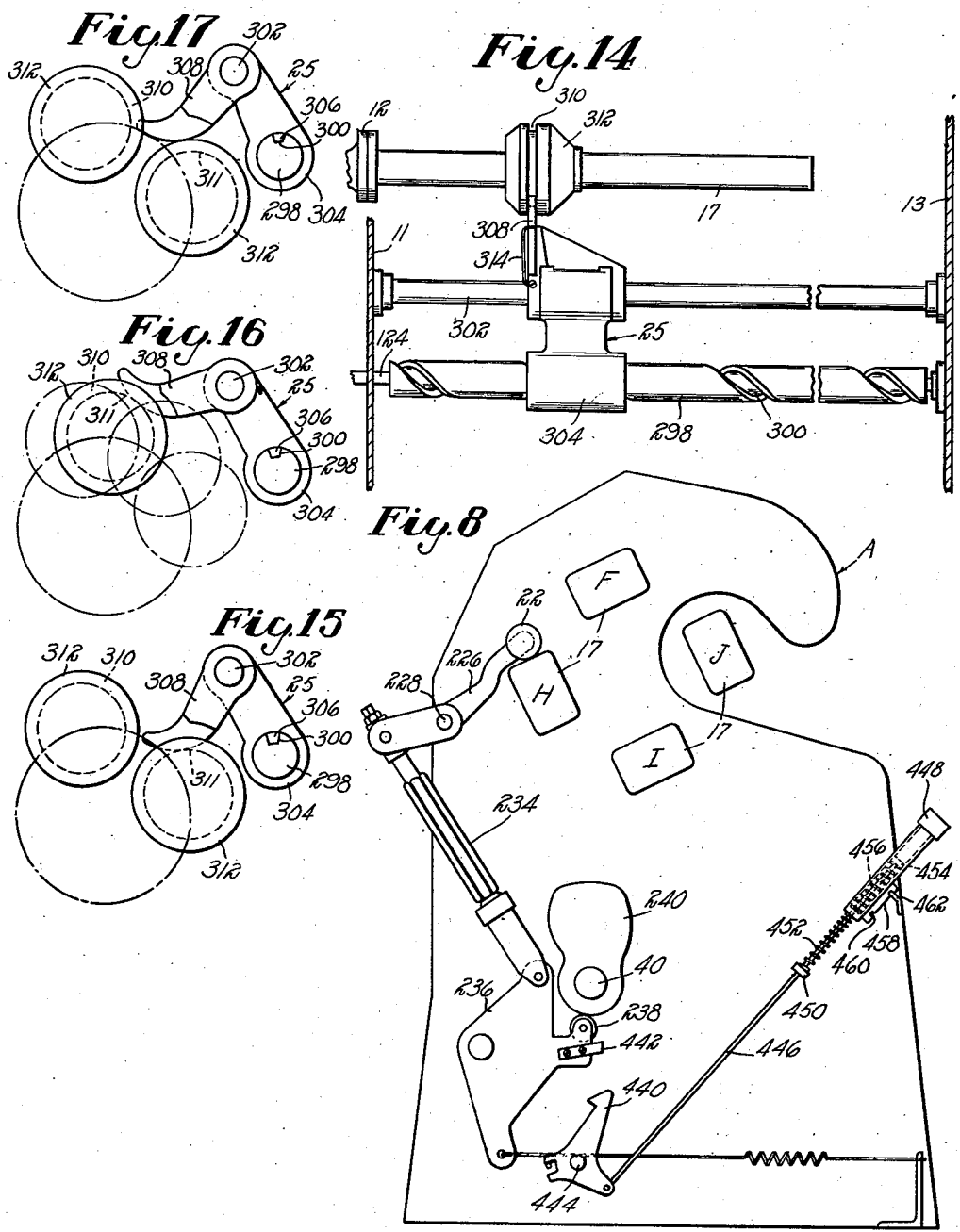

June 30, 1942.   A. G. HATCH ET AL   2,288,161
METHOD OF AND APPARATUS FOR FORMING FIBER CAN BODIES
Filed July 21, 1938   9 Sheets-Sheet 8

Inventor
ALEXANDER G. HATCH
ROBERT S. CONDON
By K. C. Clay Lindsey.
Attorney

June 30, 1942.  A. G. HATCH ET AL  2,288,161
METHOD OF AND APPARATUS FOR FORMING FIBER CAN BODIES
Filed July 21, 1938  9 Sheets-Sheet 9

Inventor
ALEXANDER G. HATCH
ROBERT S. CONDON

By W. Clay Lindsey.
Attorney

Patented June 30, 1942

2,288,161

UNITED STATES PATENT OFFICE 2,288,161

METHOD OF AND APPARATUS FOR FORMING FIBER CAN BODIES

Alexander G. Hatch and Robert S. Condon, Rutland, Vt., assignors to Fibre Can Machinery Corporation, Rutland, Vt., a corporation of Vermont Application July 21, 1938, Serial No. 220,474

24 Claims. (Cl. 93—81)

The present invention relates to an apparatus for the production of fiber can bodies and the method of manufacturing same.

An object of the present invention is to provide an improved machine and method for convolutely winding fiber can bodies having a relatively thin lining and an outer container of heavy body material which is subsequently wound over the lining material.

In the particular machine described and illustrated herein, provision is made for carrying out four successive operations; the first being to wind the lining into tubular form; the second, to wind a heavy fiber material around the lining to form an outer body; the third, to apply a label around the outer body; and, the fourth, to eject the container body from the machine. This may be done by providing a mandrel mounted on an indexible turret such as in the machine illustrated and alternately indexing the turret to successive stations to position the mandrel adjacent auxiliary mechanism adapted to supply the paper and adhesive to be wound thereon and rotating the mandrel when indexed to wind the paper thereon; or it may be accomplished by providing a single rotatable mandrel and successively bringing the auxiliary mechanism into position adjacent thereto.

A still further object is the provision of a method and means for making the linings of extremely thin material. It has heretofore been found that in attempting to use said material that upon applying adhesive thereto the material would wrinkle and tear and it was impossible to successfully wind same into tubular form. However, in the present instance, the thin winding material is positioned at the mandrel while dry, and it is adhesively treated as it is being wound onto the mandrel. It is understood that the relatively thin material may be previously coated with adhesive and subsequently dried and led in a dry state to the mandrel, whereupon the adhesive treating will consist in wetting the adhesive as the material is being wound onto the mandrel.

A still further object is the provision of improved means for positioning the paper onto the mandrel and including a feed table and a cutting device for severing the paper when a predetermined amount has been wound, and wherein the actuation of the cutting device is controlled by the movements of the feed table.

A still further object is the provision of improved means for laying down the paper as it is being wound about the mandrel and for laying down the heavy body material as it is being wound about the lining material; there being provided means for initially wiping the body material into engagement with the lining material and then maintaining it in engagement during the winding thereon.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings:

Figure 1 is a side view of a machine embodying the invention herein;

Fig. 2 is an end view looking from the right of Fig. 1 with many of the details omitted for purposes of clarity;

Fig. 3 is a diagrammatic end view of the driving mechanism;

Fig. 4 is a diagrammatic exploded view of the driving means shown in Fig. 3, the centers of the various shafts corresponding to the centers of the shafts shown in Fig. 3;

Fig. 7 is a perspective view of the feed table and cutting device operating and control means;

Fig. 8 is an end view of the lay-down roll operating means;

Fig. 10 is a perspective view of the double wiping and lay-down roll;

Fig. 12 is an end view of the label applying mechanism and ejecting means;

Fig. 14 is a more or less diagrammatic plan view of the ejecting mechanism;

Figure 18:
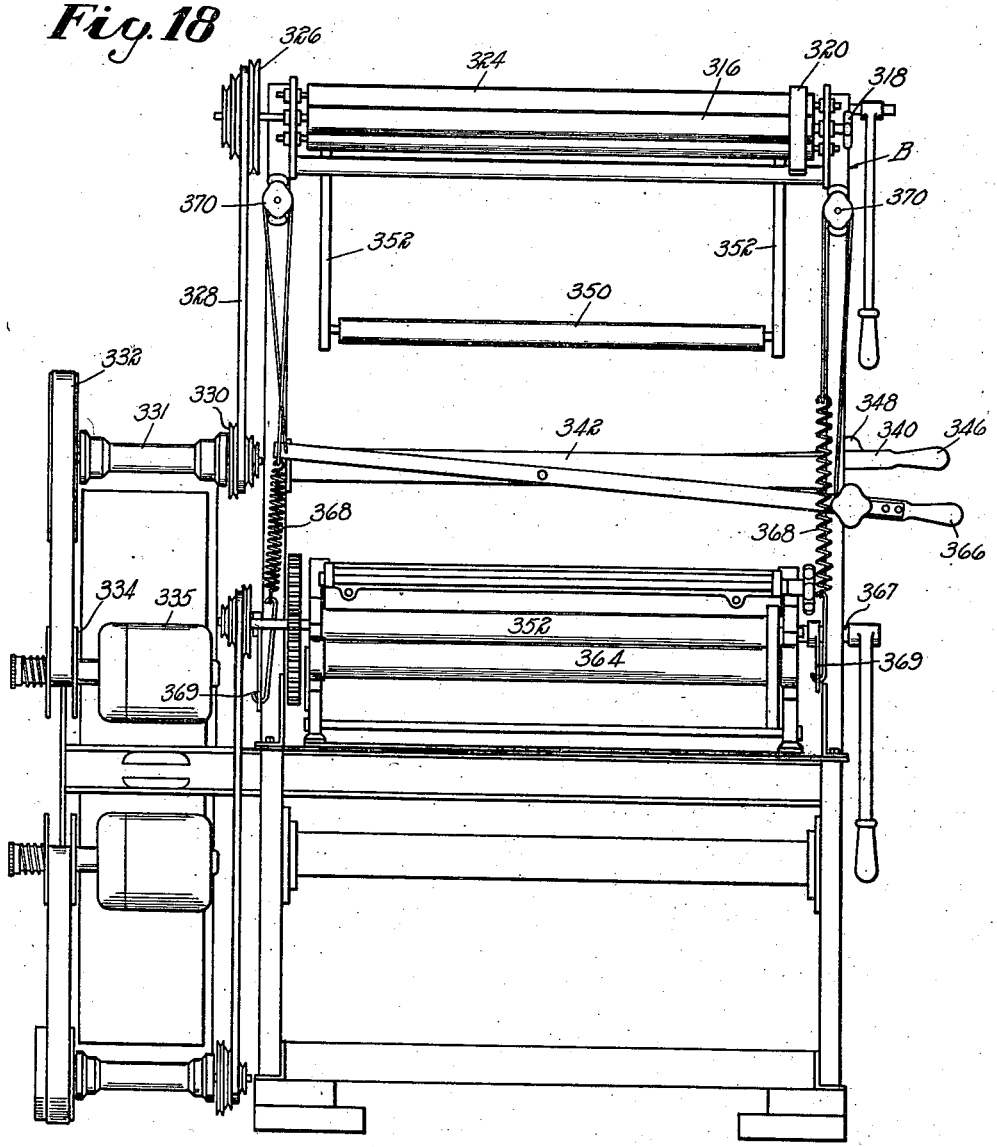

Figs. 15, 16, and 17 are diagrammatic views illustrating the operation of the ejecting mechanism; and Fig. 18 is a front view of the feed paper feeding mechanism.

Referring to the drawings, and more particularly to Fig. 1, there is generally shown a winder A, a paper feeding mechanism B, and a parent roll stand C. There is also provided a second parent roll stand of identical structure to the one shown for supporting a roll of lining material E which is led therefrom to the feeding mechanism B and then to the initial station F of the winder A. As previously stated, the machine constructed in accordance with the present invention is adapted for the manufacture of can bodies comprising an inner lining of extremely thin material, and the lining material E may be composed of a strip of thin flimsy material with impervious characteristics, such, for example, as thin sheets of cellulose derivatives such as Cellophane. In accordance with the disclosure herein, the lining is wound into tubular form having an overlapped glued seam, and the outer surface thereof from the leading edge thereof is adhesively covered for securing the overlap and subsequently winding thereon an outer body for supporting the lining material and forming therewith a substantially rigid one-piece container. For the latter purpose, there is supported in the illustrated parent roll stand C a roll of stiff, coarse fibrous material for forming the body; the material being led therefrom from the feed mechanism B and then to the second station H of the winder A where it is wound over the lining material and around itself into a plurality of contacting coils.

The winder A comprises spaced side housings 11 and 13 (see Fig. 2) supported on a base 15. The side housing 11 has positioned therein a rotatable turret 10 in which there is journalled a plurality of spindles 12; each spindle being adapted to support a transversely extending mandrel 17. Located adjacent the side housing 11 is a gear casing 14 in which there is positioned a suitable drive mechanism adapted to alternately index the turret 10 to successive stations and rotate the spindles 12 and mandrels 17 when indexed at the successive stations, and likewise adapted to provide a dwell between each indexing of the turret and each rotation of the mandrels.

Considering the letter F as designating the first station, there is associated with the mandrel F a feed table 18 for positioning the lining material onto the mandrel 17, a cutting device 20 for severing the paper when a predetermined length has been wound onto the mandrel, and a lay-down roll 22 and an adhesive treating supply means 24; the lay-down roll 22 also serving to transfer the adhesive from the adhesive treating means to the lining material.

Considering the letter H as designating the second station, there is provided a feed table 18 and cutting device 20, of similar construction to those of the first station, and lay-down mechanism 26 including a wiping roll 28 and a lay-down roll 30, the wiping roll functioning to wipe the initial lead of the body material into contact with the lining material and the lay-down roll functioning to maintain it in contact therewith during the rotation of the mandrel.

Considering the letter I as designating the third station, there is provided a plurality of labelling devices 23 (see Fig. 2) adapted to position a number of labels against the body material corresponding in number to the can bodies wound upon the mandrel.

Considering the letter J as designating the fourth station, there is provided suitable mechanism 25 for ejecting the wound cans from the mandrel.

In all of the foregoing stations the auxiliary mechanisms associated with the mandrels are adapted to be operated in timed relationship to the indexing of the turret and the rotation of the mandrels; it being apparent that the various mechanisms could be used with machines of the single spindle or mandrel type as well as the turret machine illustrated; the various details of the foregoing mechanism being hereinafter more fully described.

The drive mechanism for indexing the turret and rotating the mandrels is illustrated in Figs. 3 and 4, wherein there is provided a motor M connected by a belt 32 to a pulley 34 keyed on the rotatable shaft 36. The shaft 36 also has keyed thereon a pinion 38 which meshes with a gear 39 keyed to a shaft 40 which extends transversely of the machine and, as hereinafter described, has mounted thereon a plurality of cam means adapted to operate the various auxiliary mechanisms in timed relationship to the operation of the turret and to one another.

There is also keyed on shaft 40 a gear 42 which meshes with a gear 44 keyed on one end of a shaft 46. The other end of shaft 46 has secured thereon a crank 48; the outer end of the crank being provided with a follower 50 adapted to ride in a guideway 52 provided in the side of a segmental gear rack 54. The gear rack 54 is mounted upon a stud shaft 56 and adapted upon rotation of the crank 48 to be oscillated about its supporting stud shaft 56. The rack 54 meshes with a gear 58 keyed on a shaft 60 and alternately rotates the shaft in opposite directions.

The shaft 60 has keyed thereon a pinion 62 which meshes with a gear 64 carried by a sleeve 66, which sleeve is rotatably mounted but held against transverse movement on the shaft 74 and is provided at its outer end with clutch-engaging teeth. The shaft 74 extends through the gear casing 14 and the turret 10; the turret being keyed thereto for simultaneous rotation therewith. There is also splined for transverse movement on the shaft 74 a transversely slidable clutch 76 provided with clutch-engaging teeth on its inner end adapted to cooperate with the clutch-engaging teeth on the outer end of the sleeve 66 for simultaneous rotation therewith. The clutch 76 is also provided with a flange 78 having an opening 80 therethrough adapted to receive a stop pin 82 carried by the casing 14 when the clutch is moved out of engagement with the sleeve and thus lock the shaft 74 and turret against rotation.

Thus when the clutch 76 is in the position shown, upon rotation of the shaft 60 the pinion 62 will rotate the gear 64 and simultaneously rotate the clutch 76 to index the turret to another station.

The shaft 60 is also provided at its outer end with a gear 84 meshing with a gear 86 carried on one end of a shaft 88; the other end of the shaft being provided with a gear 90 which meshes with a second gear 92 carried on a sleeve 93 provided at its outer end with clutch-engaging teeth and adapted to be rotated but held against transverse movement on the shaft 74.

There is also mounted on the turret shaft 74 a gear 95 carried on a sleeve 96 and provided at its outer end with clutch-engaging teeth adapted to cooperate with the teeth of sleeve 93 and moved transversely and into engagement therewith. In the position shown, the gear 95 is held against rotation by a stop 97 carried by the turret 10 and extending into an opening in the side face of the gear, where upon rotation of the turret the gear will rotate simultaneously therewith. The gear 95 also meshes with the gears 98 carried on the inner ends of the spindles 12, and when locked in the position shown the turret and spindles index as a unit.

In order to alternately index the turret and rotate the mandrels, the clutch 76 and gear 96 are transversely movable by a yoke 99 which engages through depending fingers 100 with the clutch 76 and gear 96. The yoke 99 is slidably mounted on a shaft 101 by a rod 102 which is pivoted intermediate of its ends to the gear casing 14 and provided at its lower end with a follower 104 which extends into the groove of a cam 106, which cam is keyed to the main cam shaft 40 and is constantly rotated in one direction. When the cam 106 rotates sufficiently, it will cause yoke 99 to be shifted transversely to the left to lock clutch 76 against stop 82 and move gear 95 into engagement with sleeve 93, simultaneously moving it out of engagement with the stop 97, whereupon rotation of the gear 92 will rotate gear 95 about the shaft 74 and simultaneously rotate the mandrel spindles 12.

In order to obtain a smooth operation, the shifting of the yoke 99 is done during a dwell in the operation of the gear rack 54. To accomplish this, the gear teeth on the segmental rack are terminated short of the ends thereof, and there is provided oppositely disposed keys 108 which, at the extremity of motion of the rack, enter into a suitable keyway (not shown) in the side of the gear 58.

The ejector operating means 25 is also adapted to be alternately rotated in opposite directions through the drive mechanism, and to accomplish this there is also mounted on the shaft 60 a gear 116 which meshes with a gear 118 carried on the shaft 120; the gear 118 meshing with a gear 122 keyed to the ejector operating shaft 124. The outer end of the shaft 124 may be provided with a suitable friction brake 125 to take up the backlash of the gears and provide a smoother operation.

With the foregoing driving mechanism, it will be seen that from a single driving source the turret is alternately indexed to successive stations and the mandrels rotated at each station; there being provided an intermediate dwell between each of the above operations, and through the constantly driven cam shaft the various auxiliary mechanisms are operated in timed relation to the operation of the turret, as hereinafter described.

The outer ends of the mandrel 17 adjacent the housing 13 may be provided with any suitable releasable supports such as those disclosed and illustrated in the copending application to the same inventors, Serial No. 166,598, and for purposes here it need only be pointed out that the mechanism is operated by a cam 130 carried on the cam shaft 40 and operated in timed relationship to the other mechanism.

Considering the auxiliary mechanism at the station F, the feed table 18 comprises oppositely disposed bracket members 131 which are pivotally supported on a shaft 132 extending transversely of the machine. The bracket members 131 extend rearwardly and upwardly and support therebetween a curved table plate 135 onto which the lining material E is fed and upon which it may be maintained in position by a curved shield 136 having its forward end resiliently resting on the lining material. The lining material E, in being fed to the curved table plate 135, is initially led over a transversely extending non-back-up roller 141 which also extends transversely between the supporting brackets 131 and is mounted for rotation only in a clockwise direction, as viewed in Fig. 5. Rotation of the non-back-up rollers 141 in a counterclockwise direction is prevented by a ball clutch 141a which may be of the usual type consisting of a collar 143a keyed to a shaft 165a upon which the non-back-up rollers 141 are freely rotatable. The collar 143a fits within a recess in the end of the roller 141, and the collar is provided with a groove having a camming shoulder 147a extending from the periphery thereof inwardly and terminating at its upper end in a radial shoulder 149a. Disposed within the groove is a ball 151a normally spring pressed outwardly by a spring 153a positioned between the ball and the radial shoulder 149a. Thus as the roller 141 is rotated in a clockwise direction the ball will ride upwardly on the cam shoulder and permit free rotation thereof; whereas rotation in a counterclockwise direction will cause a downward rotation of the ball to clutch and hold the roller 141 stationary. This type of clutching means may be used wherever non-back-up rollers are herein referred to. Disposed above the non-back-up roller 141 are a plurality of cooperating non-back-up rollers 146 which are mounted for rotation in a counterclockwise direction, as viewed in Fig. 5. Each roller 146 is supported in a bracket 144 keyed to a shaft 142 extending transversely of the brackets 131. When in the position shown in Fig. 5, the non-back-up rollers 146 rest upon the lining material E and maintain it in contact with the non-back-up roller 141, and due to the fact that the non-back-up rollers may only rotate in a direction to feed the lining material E towards the mandrel, they serve to prevent the paper from being drawn rearwardly and off the feed table.

After passing between the non-back-up rollers, the lining material passes beneath suitable slitter knives 148 which are adapted to cut the same longitudinally into strips of any desired width. The slitter knives are supported on brackets 145 which are likewise keyed to the shaft 142, being angularly disposed relative to the non-back-up rollers 146. Located beneath the lining material E are a plurality of knife back-up rollers 147, against which the slitter knives 148 are maintained. Each knife back-up roller 147 is supported on a bracket 149 provided with a suitable keyway 151 adapted to fit over the key 153 provided on a cross plate 155 extending transversely between the supporting brackets 131. The knife back-up rollers 147 and the non-back-up roller 141 are in tangential alignment with the rear edge of the supporting plate 135 and assist in aligning the paper thereon as it is being led to the mandrel 17.

Figure 5:
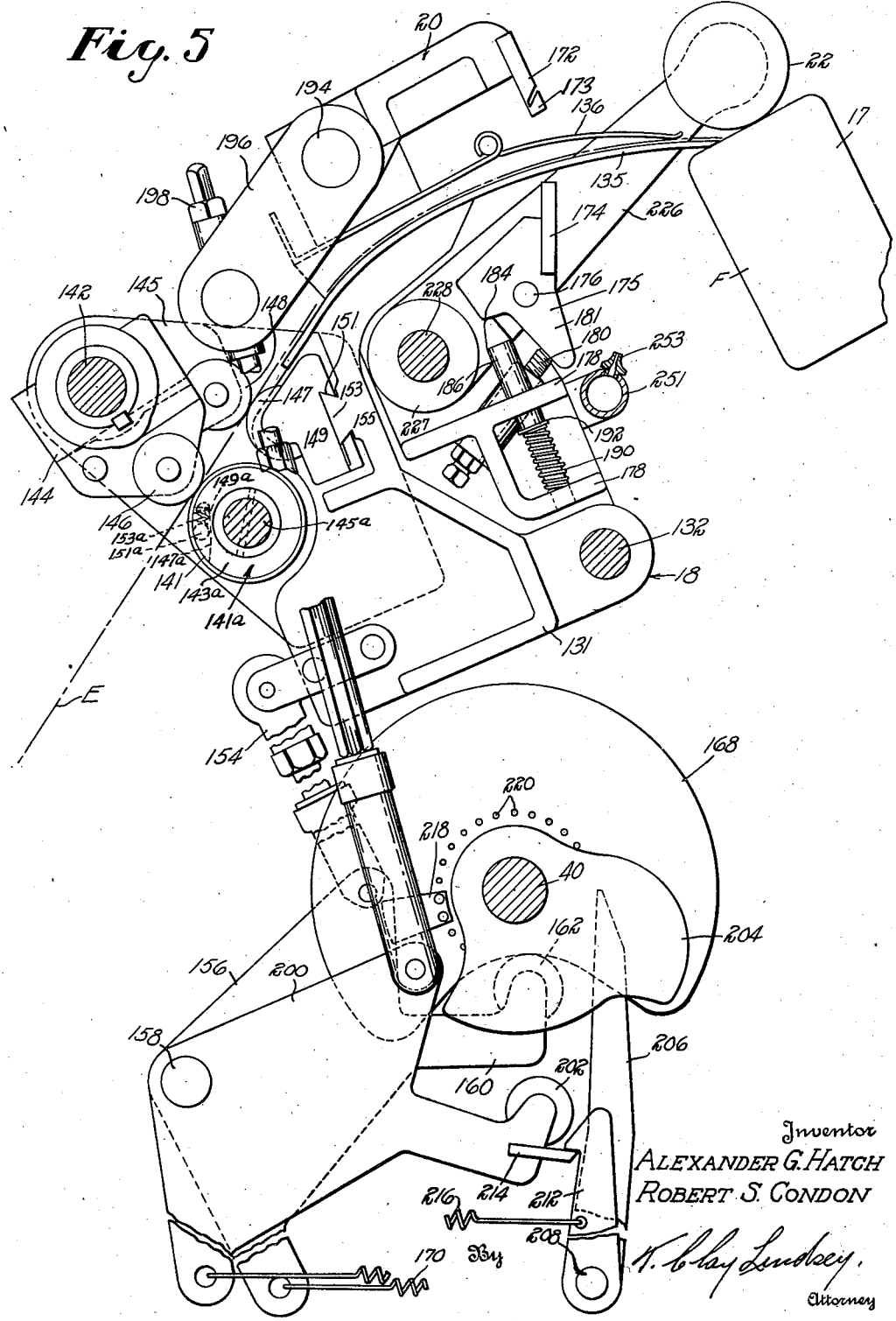
Fig. 5 is a sectional view of an improved feed table, cutting device, and lay-down roll.

The transversely extending shaft 142 which supports the slitter knives 148 and non-back-up rollers 146 is journalled in the end brackets 131 and provided on its outer end with a suitable operating lever 150 (see Fig. 1) having an operating handle 152 which may extend through the lower end of the lever and engage with spaced openings on the bracket 131 to adjust the shaft 142 and lock it in various positions. As indicated in Fig. 5, the shaft 142 is so adjusted that the slitter knives 148 and non-back-up rollers 146 are both in operation. However, in the initial feeding of the lining material, the shaft 142 may be rotated counterclockwise to lift both the slitter knives and non-back-up rollers out of position, whereupon the lining material E may be readily threaded over the table. The shaft 142 may then be rotated to position the non-back-up rollers 146 in operative position to hold the lining material during the initial run while the machine is being properly adjusted, and subsequently the shaft 142 may be further rotated to position the slitter knives 148 against the lining material.

The pivoting of the feed table about the shaft 132 is accomplished through a link 154 which connects at its upper end to the table bracket 131 and extends downwardly therefrom and is pivotally connected at its lower end to the upper corner of a substantially diamond-shaped lever 156. The lever 156 is pivoted on a shaft 158 extending transversely of the housing members 11 and 13 and is provided at a point substantially opposite the pivot with an outwardly extending arm 160 which carries a cam follower 162 which cooperates with a constantly rotated cam 168 mounted on the main cam shaft 40, which cam is adapted upon rotation to alternately pivot the feed table 18 about shaft 132 and into and out of position relative to the mandrel 17. In order to maintain the cam follower 162 in constant engagement with the cam 168, the lowermost corner of lever 156 may be interconnected through a suitable tension spring 170 with the frame member in such manner as to normally rotate the upper end of lever 156 counterclockwise and thus urge the link 154 and feed table 18 towards feeding position.

Inasmuch as the feed table 18 pivots in the arc of a circle about the shaft 132 and carries therewith as an integral structure the non-back-up rollers and slitter knives, the amount of space required for the operation thereof is reduced to a minimum and the entire structure may be readily removed or replaced upon the machine.

As indicated in Fig. 5, when the feed table 18 is in its forward pivotal position, the feed table plate 135 thereof lies closely adjacent the mandrel 17 to feed the material E directly thereon, and the feed table is so positioned that the plate 135 thereof lies between the upper and lower knives 172 and 174 of the transverse cutting device. However, when the feed table lies in its rear pivotal position, the plate 135 is withdrawn from between the cutting device, and the upper shearing knife 172 is then adapted to move downwardly and over the knife 174 to sever the paper when a predetermined length has been wound upon the mandrel 17. This is accomplished by supporting the upper knife 172 on a transversely extending shaft 194; the knife being provided at one end with a rearwardly extending link 196 which is pivotally connected to a vertically disposed actuating link 198. The lower end of link 198 is pivotally connected to a lever 200 of like construction to the feed table operating lever 156 and carries thereon a cam follower 202 adapted to cooperate with a rotatable cam 204 which is also carried on the main cam shaft 40.

In the present machine, the cutting device is adapted to be actuated in timed relationship to the movement of the feed table and is controlled by the movement of the feed table, thus assuring the material being cut when the desired predetermined length which is to be wound upon the mandrel is in alignment with the cutting knives; the mandrel continuing to rotate after the cutting in order to lay down the trailing edge of the material. The means for controlling the operation of the cutting device are best seen in Fig. 7 wherein the feed table operating cam 168 is provided with a trip release 218 which may be circumferentially adjusted thereon in the spaced openings 220, whereby it will periodically engage the upper end of a trip lever 206 which is pivotally mounted on a shaft 208 and connects through a collar 210 with a latch 212. The latch 212 engages an outwardly projecting stop 214 on the shear actuating lever 200. The trip levers 206 and 212 are normally urged to rotate in a counterclockwise direction about the shaft 208 by a suitable spring 216 to maintain the latch 212 in engagement with the stop 214, whereupon the cutting knife 172 will be in its upper or open position.

The trip 218 on cam 168 is so positioned that it will engage the lever 206 when the desired predetermined length of material has been fed towards the mandrel and the feed table supporting plate has been moved rearwardly to clear the cutting knives 172 and 174, whereupon the lever 206 will be rotated in a clockwise direction to simultaneously rotate the latching lever 212 out of engagement with stop 214, whereupon the upper knife 172 will fall and ride over the cutting edge of the lower knife 174 to transversely sever the material. Upon continued rotation of the cam shaft 40, the shear cam 204 will engage the shear lever cam follower 202 to pivot the lever 200 clockwise about the shaft 158 and lift the knife 172 to open position. As the lever 200 is being rotated, the stop 214 will ride over the upper end of latch 212, rotating same in a clockwise direction until the stop rides beneath the end thereof, whereupon spring 216 will again urge it into inter-latching engagement.

Inasmuch as the trip release 218 may readily be positioned at any desirable point on the cam 168, the amount of paper being fed to the mandrel may be accurately controlled, and, as in the present machine where there are provided two stations, the amount of paper being fed at one station may be greater or less than the amount of paper being fed at another station.

In order to insure clear severance of the paper throughout its width, the lower knife 174 is mounted for a limited pivotal movement on oppositely disposed, substantially triangular plate members 175 carried on a shaft 176 extending transversely of the supporting brackets 178, which brackets are provided with adjusting means for allowing said pivoted movement. The adjusting means includes an angularly disposed adjustment screw 180 which engages with a depending tongue 181 of the plate 175 and is adapted upon adjustment thereof to pivot the knife 174 on its supporting shaft 176. The movement of the knife is opposed or assisted by a spring pressed pin 186 engaging a downwardly facing shoulder 184 on the knife supporting plate 175. The pin 186 extends through an opening in bracket 178 and is normally urged outwardly by a spring 190 positioned intermediate of a shoulder 192 on the pin and the upper face of the lower bracket 178. The upper blade 172 is provided with a downwardly depending finger 173 which initially engages the lower cutting edge 174, and due to the arc of movement of the upper shear knife it will tend to pivot the lower blade 174 counterclockwise against the spring tension of pin 186, and thus urge and maintain the lower cutting edge into engagement with the upper cutting edge, thus assuring a complete severance of the lining throughout its width.

As indicated, when the feed table is in the position shown in Fig. 5 the forward end of the lining material extends beyond the plate 135 and rests on the mandrel 17. As the feed table is pivoted away from the mandrel the paper is maintained in engagement on the mandrel by a suitable suction device such as that described in the above-mentioned co-pending application to the same inventors. In order to lay down each successive convolution of paper over the preceding convolution, there is provided a lay-down roll 22 carried on the outer end of a lever 226 pivotally mounted by a collar 227 on a transversely extending shaft 228 carried by flanges of brackets 178. The collar 227 is held to shaft 228 by a screw 227a extending through a keyway 227b which permits a limited movement of the collar relative to the shaft.

The lever 226 (see Fig. 10) is further connected to the shaft 228 by a spiral spring 229 having one end 230 engaged to the lever and the other end 231 to the shaft and normally tending to rotate the lever in a counterclockwise direction. The shaft 228 connects through a link, similar to 196 (see Fig. 8), to a downwardly extending link 234 of like construction to link 198, which link is pivotally connected at its lower end to an actuating lever 236 of similar construction to lever 156.

The cam follower 238 on lever 236 contacts a cam 240 on the main cam shaft 40, and upon rotation of the cam 240 the lever 236 will pivot the shaft 228 in a clockwise direction and, through spring 229, carry the lay-down roll downwardly and into engagement with the mandrel 17. The lay-down roll 22 will engage prior to the complete pivoting of shaft 228, whereupon spring 229 will have a tendency to wind and exert pressure on the lever 226 to maintain the lay-down roll in contact with the mandrel. Upon rotation of the mandrel, the clearance between screw 227a and keyway 227b is such that any irregularities of movement of the lay-down roll due to the difference in shape of the mandrels will simply cause the arm 226 to oscillate on shaft 228 against the tension of spring 229, and thus the irregularity in movement of the lay-down roll will not be carried back through the linkage to the operating cam.

Figure 9:
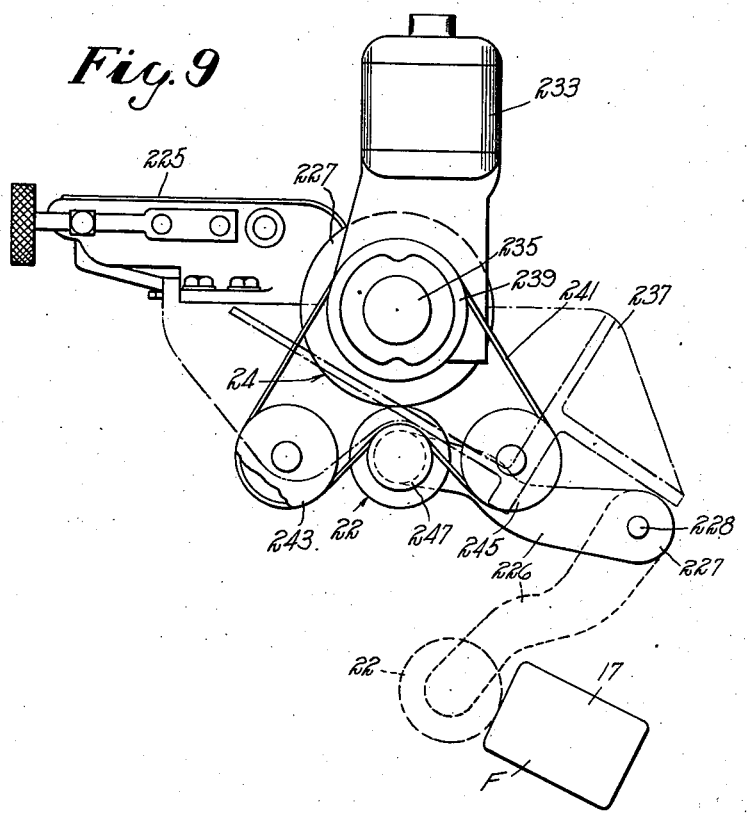
Fig. 9 is an end view of the adhesive treating means for the lining material.

In the present instance, the roll 22, in addition to functioning as a lay-down roll, also functions to adhesively treat the lining material as it leaves the feed table and is drawn onto the mandrel for the winding operation. In this manner, the lining material reaches the mandrel while it is dry, and the difficulties heretofore experienced in adhesively treating extremely thin material, such as Cellophane, are overcome as there will be no wrinkling or tearing of the lining material as it is fed over the feed table and onto the mandrel. The lining material could, of course, have been previously treated with an adhesive material during the manufacture thereof and thereafter permitted to dry, and it is understood that when referring to the adhesive treatment thereof it contemplates either the application of adhesive to the material or of a suitable moistener or solvent to cause the dry adhesive thereon to become tacky. This is accomplished by providing above the mandrel 17 at the station F an adhesive holding means for co-operation with the lay-down roll 22, said means comprising a tank 225 adapted to hold an adhesive treating material, and including a continuously driven roll 227 rotated by a suitable motor 233 geared thereto in any suitable way. The roll 227 is mounted on a shaft 235 extending between the supporting frame members 237 bolted to the top of the frame housings. The shaft 235 extends beyond one of the frame members 237 and is provided at its outer end with a pulley 239 (see Fig. 9) spaced relative to a pair of idlers 243 and 245 carried by the frame member 237 to form a triangle and complete a circuit for an endless drive belt 241.

The lay-down roll 22 is rotatable in its supporting levers, and one end thereof is provided with a pulley 247 which is adapted, upon the raising of the lay-down roll into engagement with glue roll 227 to be engaged by the belt 241 and be rotated thereby, whereby the entire surface of the lay-down roll 22 will have a coating of adhesive applied thereto. Upon its transfer into engagement with the lining material, it will apply the adhesive to the outer surface thereof during the winding onto the mandrel. As the material is absolutely dry until it is engaged by the lay-down roll, the tendency of same to shrink, wrinkle or tear when in moistened condition is eliminated.

There may further be provided an air supply pipe 251 extending transversely of the machine beneath the feed table plate 135 at the station F. The pipe 251 is provided with a plurality of nozzles 253 and is connected into the mandrel suction supply device or to any suitable air source and adapted to supply a blast of air as the lining material is being fed to the mandrel. This air supply will prevent any tendency of the lining material to drop over the edge of the plate and prevent its being improperly laid upon the mandrel 17.

Briefly summing up the operation at the first station, the cam shaft 40 will rotate the cam 168 to carry the feed table 18 into position to place the lining material onto the mandrel at the station F; the movement of the feed table being such that the leading edge of the lining material will be placed on the mandrel while it is stationary during a dwell between the indexing of the turret and the rotation of the mandrel. The adhesively coated lay-down roll 22 will be simultaneously transferred from the glue roll 27 onto the leading edge of the lining material, and immediately thereafter rotation of the mandrel will begin, whereupon the outer surface of the lining material will be adhesively coated as it is drawn from the feed table and wound onto the mandrel. As the mandrel is rotated, the cam 168 will carry the feed table out of position and clear of the shears, and when the proper amount of material has been wound, the trip release 218 on cam 68 will engage the trip lever 206 to release the latch 212 and permit the upper shear 172 to fall and sever the lining. In manufacturing the container bodies in accordance with the disclosure herein, the shear 172 will be released when sufficient material has been wound to provide at least one convolution plus an overlap, and inasmuch as the outer face of the lining material has been adhesively treated the opposing faces of the overlap will be adhesively secured to provide an unbroken inner lining of tubular form. Upon further rotation of cam shaft 40, the cam 204 will raise the upper shear 172 and cam 240 will transfer the lay-down roll into engagement with the adhesive supplying device. Thereafter the turret will be indexed to carry the mandrel to the next station.

Referring now to the operation of the second station; the outer body material is adhesively coated upon arriving at the feed table, and upon being brought into position on the mandrel it is necessary to wipe it into engagement with the lining material, and except for the means to accomplish this operation the structure of the feed table is the same as at the first station. It is also pointed out, however, that the timing of the shear is such that the body material will not be cut until it has been convolutely wound upon the winding material and upon itself to provide a substantially rigid one-piece container body. As the lining material was previously formed into unbroken tubular form, the inside of the containers will have an unbroken wall of lining material, thus completely covering the edge of the body material, whereby no wicking action can result when the container is subsequently filled.

In order to properly lay down the paper at the second station, there is provided a wiping roll 252 and a lay-down roll 254 (see Fig. 10) carried on an auxiliary arm 242, which arm is pivoted by a pin 244 to the outer end of the arm 226 which is connected to the shaft 228 in like manner to the lay-down roll arm at the first station. The auxiliary arm 242 is provided with a stop 246 adapted to engage a stop 248 on the arm 226 and be maintained in engagement therewith, when the arm is withdrawn from the mandrel, by a spring 250 interconnecting the auxiliary arm and the arm 226.

Upon operation of the shaft 228, the wiper roll 252 will initially be brought into engagement with the container material and spring 250 will further function to maintain same under pressure during the wiping action. As the arm 226 continues to lower, the roll 252 will roll over to wipe the body material into engagement with the lining material. When the arm has been lowered sufficiently to bring the lay-down roll 254 in position on the mandrel, due to the fact that it is off-center from the wiping roll it will simultaneously lift the former out of engagement with the mandrel.

As the lay-down roll 254 engages the mandrel, the upper stop 243 of the lever arm 242 will engage the upper stop 249 of the lever 226 and thus maintain the lay-down roll in relatively fixed position on the mandrel with the spring 250 expanded to exert its full pressure.

Figure 11:
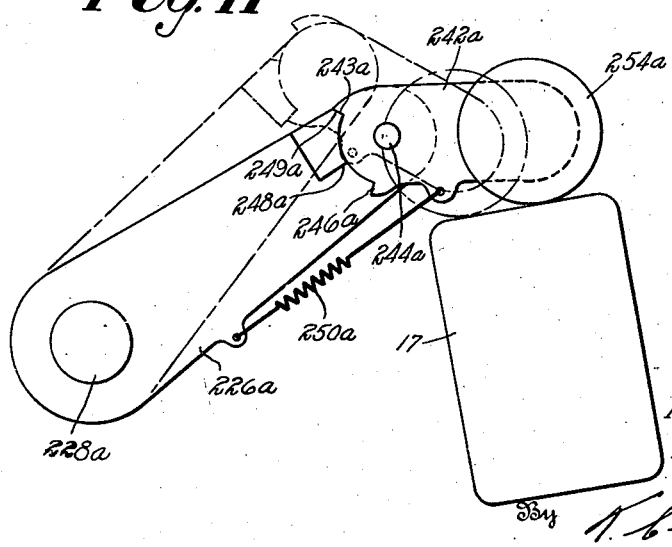
Fig. 11 is an end view of a single wiping and lay-down roll.

In Fig. 11 there is shown another embodiment of a wiping roll of substantially the same construction as that shown in Fig. 10 and where like parts have been given the same numerals with the suffix a. However, the wiping roll has been eliminated and the lay-down roll 254a is initially brought into contact with the mandrel adjacent the edge, as shown in dotted lines, and as the lever 226a moves downwardly the wiping roll 254a rolls over the surface of the mandrel to wipe the body material into engagement with the lining until it reaches the full line position as indicated.

Following the operation at the second station, the turret is indexed to carry the wound container to the third station I, at which station a label is wound around the outer container. There is provided a plurality of labelling mechanisms 23 equal in number to the number of separate cans which are wound upon the mandrel, and each comprises a container 270 having a label supporting bottom 272 which is angularly disposed to arrange the labels 273 in stepped position with the outermost label at the highest point. The tops of the containers 270 are provided with a slidable member 274 which is normally urged forwardly by a spring 276 to overlie the labels 273 and which tends to wipe off other than the uppermost label when the device moves away from the mandrel.

The containers 270 are supported on a transversely arranged shaft 278 and are normally pivoted thereabout in a clockwise direction by a spring member 280 interconnecting the containers 270 at a point beneath the shaft 278 to the frame members of the machine. The container 270 is provided with a rearwardly extending shoulder 282 which is adapted to lie beneath a stop 284 carried on the outer end of a lever 286 which is mounted on a transversely extending shaft 288 and normally urged in a counterclockwise direction by a spring 290 interconnecting the lever beneath the shaft 288 with the frame of the machine.

Intermediate of the ends of the lever 286 there is provided a cam follower 296 adapted to engage a cam 294 which is keyed to the main cam shaft 40. In the position indicated in Fig. 12, the labelling device is in position to supply a label to the container on the mandrel. However, upon rotation of cam 294 the follower 296 will be lowered, causing the stop 284 to engage the shoulder 282 of the labelling device and pivot it counterclockwise and lower the upper end thereof out of the path of the mandrels and maintain it out of position until another mandrel has been indexed to the labelling station, whereupon the follower 296 will move rapidly into the groove of cam 294 and position the topmost label against the container on the mandrel.

There is also provided at the third station a lay-down roll 400 adapted to be brought into contact with the mandrel following the application of the label thereto and to maintain contact and lay down the label as the mandrel is being rotated. The lay-down roll 400 is carried at its opposite ends by a pair of bell crank levers 402 (see Fig. 13). The levers 402 are pivotally mounted on a transversely extending shaft 404 and have their opposite ends connected to downwardly depending levers 406; the levers 406 being provided with a slot 408 through which a pin 410 extends from the levers 402, thus providing a lost motion connection therebetween. The lay-down roll is normally urged into position against the mandrel by a pair of springs 412 connected to the bell crank levers and to the frame of the machine. The levers 406 connect at their lower ends to levers 414 keyed to a transverse shaft 416, which shaft is further provided with a lever 418 connecting through a suitable adjusting rod 420 to one arm of a V-shaped lever 422. The V-shaped lever is pivotally mounted on a transversely extending shaft 424, and the other arm thereof carries a follower 426 which engages the peripheral surface of the lay-down roll operating cam 428, which cam is mounted on the main camshaft 40. There may also be provided a spring 430 normally tending to rotate the V-shaped lever 422 counterclockwise and maintain the follower 426 in engagement with the cam 428.

Figure 13:
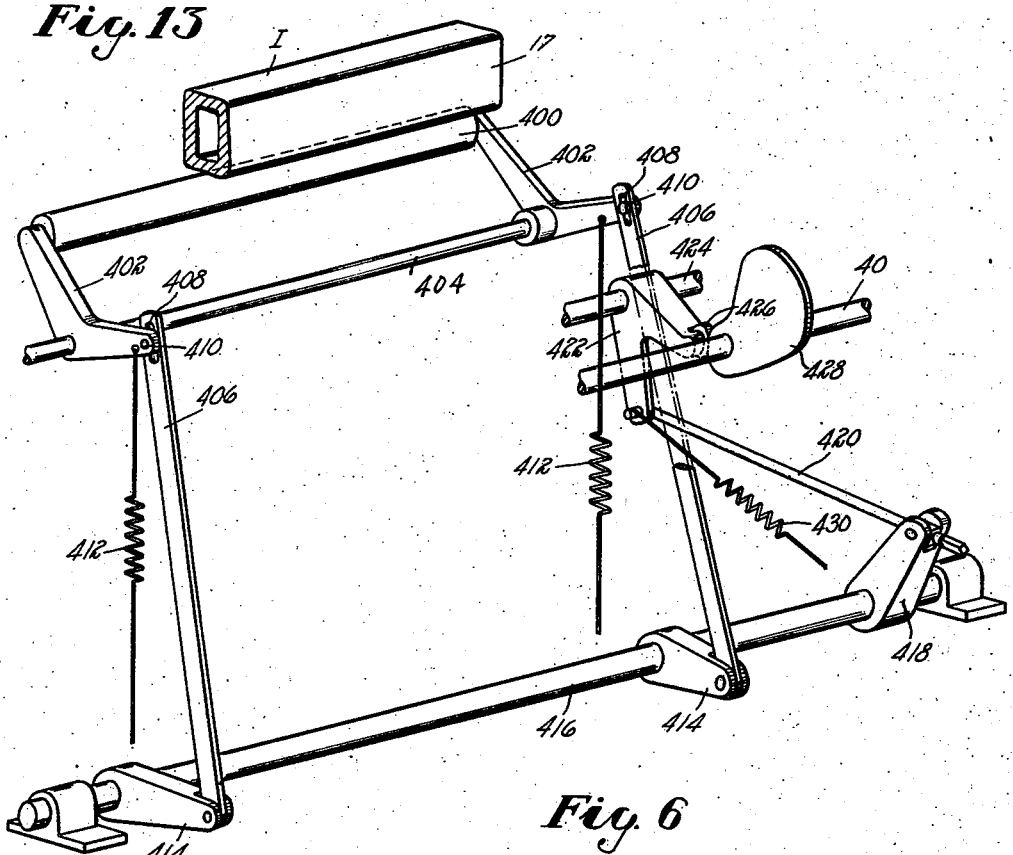
Fig. 13 is a perspective view of the label lay-down roll and operating mechanism therefor.
Figure 6:
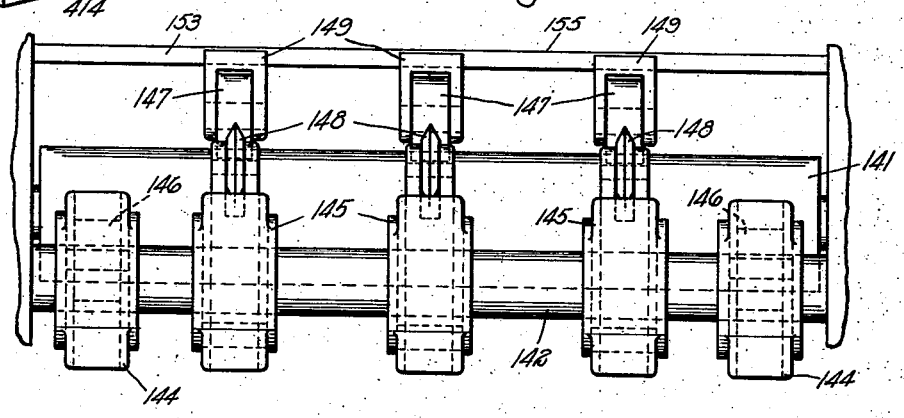
Fig. 6 is a plan view showing the non-back-up rolls and slitter knives of Fig. 5.

In the position indicated in Fig. 13, the lay-down roll is in position against the mandrel, and, as the cam 40 rotates, the V lever 422 will be rotated in a counterclockwise direction to rotate shaft 416 and raise the vertical levers 406 and rotate the bell crank levers 402 in a counterclockwise direction and move the lay-down roll away from the mandrel. Because of the lost motion between the bell crank lever 402 and the lever 406, the irregular motion of the lay-down roll in following the mandrel will not be transmitted back through the linkage. The lay-down roll, like the other auxiliary mechanism heretofore described, is, of course, operated in timed relationship and controlled by the rotation of cam shaft 40 and cam 428 mounted thereon.

Following the labelling operation, the turret is again indexed to carry the labelled containers to the last or station J, at which station the can bodies are removed from the mandrel by the ejecting mechanism 25. To accomplish this, there is provided a member 298 having a spiral groove 300 therein; the member 298 being interconnected to the driven member 124 and alternately rotated in opposite directions therewith. Positioned above the spiral member 298 and slightly forwardly thereof is a guide member 302 which is adapted to guide a follower 304, which follower is provided with a key 306 which is ridable in the groove 300 of the member 298. Pivotally mounted on the guide member 302 and adapted to be moved with the follower 304 is an ejector plate 308, the outer end of which engages in a groove 310 of an ejector sleeve 312 which is slidable on the mandrel 17. During the rotation of the mandrels, the member 298 will rotate to move the carrier and ejector plate to the right, as viewed in Fig. 14, to eject the cans from the mandrel, and upon the indexing of the turret the follower will move in the opposite direction to carry the sleeve 312 to the inner end of the mandrel and position the plate 308 in the groove of the next sleeve.

Inasmuch as it is essential that the sleeve 312 be carried back to station to its fullest extent in order to prevent interference with the paper being wound on the mandrel, the ejector plate 308 is maintained positioned within the groove 310 until the groove of the sleeve is in alignment with the groove of the next succeeding sleeve. This operation is illustrated in Figs. 15 to 17 wherein Fig. 15 shows the position of the plate 308 as the sleeve 312 is being returned to station at the inner end of the mandrel and has reached the position shown approximately in Fig. 14. During this operation, the turret is indexing and the mandrel 17 will tend to pivot the ejecting plate 308 clockwise about the guide member 302. As the mandrel continues to rotate to the various positions indicated in Fig. 16, the plate 308 will continue to pivot clockwise, riding around the inner periphery 311 of the groove 310 until the turret has indexed the sleeve past the end of the plate, whereupon the torsion spring 314 will urge the plate 308 in a counterclockwise direction to engage the outer collar of the next sleeve (see Fig. 17).

As the ejector 25 continues to move towards the inner end of the mandrel, the plate 308 will ride along the collar of the next succeeding sleeve and it is of such length that the end thereof will still continue to be positioned within the groove 310 of the preceding sleeve (see Fig. 17). However, when the ejector 25 has reached its limit of travel, the plate 308 will then be aligned with the groove of the following sleeve and, upon dropping into same, will disengage from the groove of the preceding sleeve, thus assuring the carrying of the engaged sleeve back to position at the end of the mandrel.

The mandrel from which the containers have been ejected will again be indexed to station F and the cycle of operations heretofore described will be repeated.

It is desirable, however, to provide means whereby the lay-down rolls and feed tables may be held out of operative position in order to feed the paper through the machine prior to starting and also to enable the mechanisms to be latched out of position during the operation thereof just prior to finishing or at any time during the run of the machine when it is necessary. Such a device is shown in full in Fig. 8 in connection with the lay-down roll lever 236; it being understood that there is a similar latching mechanism associated with each of the lay-down roll actuating levers and the feed table operating levers. However, as they are all of identical construction, only one need be describd.

As indicated in Fig. 8, there is provided a pivotal latch member 440 adapted to engage a latch stop 442 carried on the lever 236. The latch 440 is pivotally mounted on a transverse shaft 444 and the end thereof below the pivot is connected to a rod 446 extending upwardly therefrom and projecting through a suitable opening provided therefor in the lower end of a handle 448. Disposed between the lower end of the handle 448 and a collar 450 on the rod 446 is a spring 452, and disposed within the handle 448 and positioned between the lower end thereof and a collar 454 on the upper end of the rod 446 is a second spring 456. The handle is provided with a plate 458 provided with a pair of spaced detents 460 adapted to engage the edge of a locking plate 462 carried on the edge of the machine.

In the position shown in Fig. 8, the handle 448 has been forced inwardly and downwardly with the uppermost detent 460 engaging the locking plate 462, and the lower end of the handle 448 compressing the spring 452 against the collar 450 and thus pivoting the latching dog 440 out of latching position, whereupon the latching lever 236 will be free to be continuously operated by the cam 240. However, upon releasing the handle 448 and drawing it outwardly to engage the lower detent 460 over the locking plate 462, the spring 456 will be compressed against the collar 454 on the upper end of rod 446 to pivot the latch 440 into the path of the latching dog 442. Upon movement of the lay-down roll operating lever 236 in a clockwise direction to raise the lay-down roll, the latching dog 442 will cam the end of the latch 440 rearwardly against the tension of spring 456 until it engages beneath the lower end thereof. The lay-down roll will then remain out of operation until the handle 448 is returned to the position shown in Fig. 8. With the arrangement shown, the lay-down roll or feed tables may be latched out of position at any time during the running of the machine by the actuation of handle 448, and if the mechanism is in the middle of a cycle it will automatically be latched out upon the completion thereof. Inasmuch as the cutting devices are controlled by the operation of the feed table, the latching out of the latter will likewise prevent further operation of the cutting device. As clearly indicated in Fig. 1, the handle 448 extends within easy reach of the operator.

There is further provided improved means for guiding and feeding the paper from the parent rolls to the winder; it having been found that there is a tendency of the paper to travel from one side to the other and thus not properly align itself on the mandrel, whereupon the lining and outer container will not properly overlap and thus the end containers will not be properly manufactured. In order to properly guide the paper, the lining E is led over the transversely extending, non-rotating slide 316 carried by the side frames of the paper supply device B (see Fig. 18). The slide 316 is adjustable transversely in the frame by the handle 318 and carries thereon a guide 320 which may be positioned anywhere along the slide. The paper then passes over a driven feed roll 322 and under an idler 324. The outer end of the feed roll 322 is provided with a stepped pulley 326 which interconnects through a belt 328 with a reversed stepped pulley 330 carried on a transverse shaft 331 having on its outer end a pulley 332 which is belt driven from a suitable variable speed drive 334. The idler 324 has its opposite ends supported on the outer ends of spaced levers 336 (see Fig. 1) which are pivotally mounted on a transverse rod 338 extending between the side frames of the feed stand B.

It has been found that by varying the pressure at the ends of the idler 324 the paper can be made to travel towards the side of the greatest pressure, and to accomplish this there is provided a transversely extending lever 340 pivotally mounted intermediate of its ends on the frame cross member 342. The lever 340 is connected adjacent its ends by spring means 344 to the idler carrying levers 336 intermediate the ends thereof; one outer end of the lever 340 being provided with a handle 346 for pivoting it on the cross frame and a suitable locking screw 348 for positioning it in adjusted positions. Thus when the handle 340 is moved upwardly as seen in Fig. 18, the left end of the lever will be lowered to increase the tension on the spring member 344 and increase the pressure of the idler 324 on the left side of the frame and simultaneously decrease the tension on the spring on the right side of the idler at the right side of the frame, whereupon the lining will move to the left. As the lever 340 may be adjusted through an infinite number of positions, the paper may be accurately guided thereby and maintained in alignment with the feed tables.

The lining material E, after passing through the driven roller 322 and idler 324, passes down and beneath an idler 350 transversely supported between the downwardly extending arms 352. The arms 352 are pivotally mounted on a shaft 338 extending transversely of the frame members and are normally pivoted in a clockwise direction by the spring 356. The paper then leads from the idler 350 to the feed table 18, and as the feed table moves to feeding position, the idler 350 will be pivoted counterclockwise and, through a suitable mercury switch mounted thereon but not shown, will start the motor 335 and supply the paper toward the table. As the feed increases, the loop of the paper will increase, causing the idler 350 to move in a clockwise direction to open the switch and stop the feed.

In supplying the body material G, the paper initially passes under an idler 358 and then over a rectangular-shaped brake rod 360. The paper then passes between a feed roll 362, which is driven in like manner to the feed roll 322, and over an idler 364. The idler 364 is carried between the outer ends of levers 365 pivotally mounted on a transverse shaft 367; each of the levers 365 being provided with a downwardly extending arm 69 provided with spaced openings for receiving the idler roll pressure adjusting means. The pressure of idler 364 on the feed roll 362 is controlled in like manner to the pressure of the idler 324 on the feed roll 322 through a suitable pivotal lever 366 and springs 368. However, the connections from the lever 366 to the spring 368 are passed around pulleys 370 in order to reverse the direction thereof, whereby lever 336 will be adjustable in the same direction as lever 340 to make corresponding changes in the pressure of the idler 324.

The paper G then passes beneath the gluing roll 372 where adhesive is applied to the upper surface thereof, then over an idler 374, and under an idler 376; the idler 376 being mounted in like manner to the idler 350 and adapted to start and stop the motor of the lower feed roll 362.

It is obvious from the foregoing that the particular details of construction might be widely varied and that many of the features herein might be used independently of a multi-spindle winder and in conjunction with a single spindle winder. However, it is pointed out that in the making of lined cans the machine shown is particularly suitable in that it carries out the method of applying adhesive to a dry material as it is being wound into a liner and accurately cuts the paper when a desired predetermined length has been wound upon the mandrel.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In a machine of the character described, a rotatable mandrel, means for intermittently rotating said mandrel, means for intermittently feeding a strip of material to said mandrel to be wound thereon, means for cutting said material when a predetermined length of material has been wound thereon, and means controlled by the movement of said feeding means for releasing said cutting means.

2. In a machine of the character described, an indexible turret, a rotatable mandrel carried by said turret, means for indexing said turret to successive stations and rotating said mandrel when indexed at the stations, means for winding a strip of material on the mandrel when indexed at the first station, means for adhesively treating said strip of material during the winding, means for winding a second strip of material over the first strip when indexed at the next station, and means for initially wiping said second strip into engagement with said first strip and then laying down said second strip during winding of the strip.

3. In a machine of the character described, a rotatable turret, a rotatable mandrel carried on the turret, means for rotating said turret to successive stations and for rotating the mandrel when indexed at the stations, means for supplying a strip of material to be wound on the mandrel when indexed at one station, means for adhesively treating the outer surface of the strip when wound at the first station, means for winding a second strip of material over the first strip when indexed at the second station, and means associated with the mandrel at the second station for initially wiping said second strip into engagement with said first strip and then laying down said second strip, said means comprising a lay-down roll, a pair of arms supporting the opposite ends of said lay-down roll, a pair of levers pivotally supporting said arms, a transverse shaft on which said levers are mounted, means for rotating said shaft to move said lay-down roll into position on said mandrel, and spring means limiting the pivotal movement of the supporting arms relative to the supporting levers.

4. In a machine of the character described, an indexible turret, a rotatable mandrel carried on the turret, means for indexing said turret to successive stations and for rotating the mandrel when indexed at the stations, means for winding a strip of material on the mandrel at the first station, means for adhesively treating said strip as it is being wound at said first station, means for winding a strip of material over the first strip when indexed at the second station, a wiping roll and a lay-down roll associated with said mandrel at the second station, a pair of arms supporting the opposite ends of said rolls, said lay-down roll being set rearwardly and above the wiping roll, and means for moving said rolls into contact with said mandrel, whereby said wiping roll will initially engage the mandrel and said lay-down roll will then engage said mandrel and lift said wiping roll out of engagement therefrom.

5. In a machine of the character described, a rotatable turret, a rotatable mandrel, means for intermittently rotating said mandrel, means for supplying a strip of material to be wound thereon, a lay-down roll associated with said mandrel, actuating means for moving said lay-down roll into position on said mandrel, and means connecting said lay-down roll to said actuating means whereby said lay-down roll may oscillate independently of said actuating means.

6. In a machine of the character described, a rotatable turret, a mandrel, means for intermittently rotating the mandrel, means for supplying a strip of material to be wound thereon, a lay-down roll associated with said mandrel, a pair of oppositely disposed members, a shaft on which said members are rotatably mounted, and means connecting said levers to said shaft whereby said members may oscillate relative to said shaft.

7. In a machine of the character described, a rotatable mandrel, means for intermittently rotating said mandrel, feed means for supplying a strip of material to be wound thereon, means for cutting said strip of material when a predetermined length has been wound thereon, means for intermittently operating said feed means, and means controlled by said feed operating means for releasing said cutting means.

8. In a machine of the character described, a rotatable mandrel, means for intermittently rotating said mandrel, a feed table movable towards and from said mandrel and adapted to supply a strip of material to be wound thereon, cutting means positioned intermediate of the feed table and the mandrel and through which said table is moved, and means controlled by the movement of the feed table for releasing said cutting means.

9. In a machine of the character described, a rotatable mandrel, means for intermittently rotating said mandrel, a feed table adapted to be moved towards and from said mandrel for supplying a strip of material to be wound thereon, means for cutting said strip of material when a predetermined length has been wound thereon, means for moving said table towards and from said mandrel, latching means normally holding said cutting means in open position, and means controlled by said feed table operating means for tripping said latch and releasing said cutting means.

10. In a machine of the character described, a rotatable mandrel, feed table means for feeding a strip of paper to said mandrel, means for cutting said strip when a predetermined length has been wound thereon, means for intermittently moving said feed table towards and from said mandrel, and means operated by and in timed relationship to said last-named means for releasing said cutting device.

11. In a machine of the character described, a rotatable mandrel, means for intermittently rotating said mandrel, a feed table adapted to be intermittently moved towards and from said mandrel, means for normally securing said feed table out of operation, and manually operable means for rendering said feed table securing means inoperative.

12. In a machine of the character described, a rotatable mandrel, means for intermittently rotating said mandrel, a feed table adapted to be intermittently moved towards and from said mandrel, means for normally securing said feed table out of operation, manually operable means for rendering said feed table securing means inoperative, a lay-down roll, means for normally securing said lay-down roll out of operation, and manually operable means for rendering said lay-down roll securing means inoperative.

13. In a machine of the character described, a rotatable mandrel, a feed table for intermittently feeding a strip of paper to said mandrel and adapted to be pivoted through an arc of a circle, said feed table having a curved surface, means for maintaining the paper in contact with said surface, and means for pivoting said feed table.

14. The method of producing lined can bodies, which comprises leading a strip of dry lining material to a mandrel, winding said strip onto the mandrel and simultaneously applying adhesive to the surface thereof as it is being wound, cutting the strip when a predetermined length has been wound thereon, moving the mandrel to a second position, leading a body material to the mandrel at the second position, winding said body material around said lining material, and severing said body material when a predetermined length has been wound thereon.

15. In a machine of the character described, a rotatable mandrel, means for intermittently rotating said mandrel, means for intermittently feeding a strip of material to said mandrel, driven means for supplying a strip of material to said feed means, pressure means associated with said driven means, and means for varying said pressure means to adjust the transverse position of the strip.

16. In a machine of the character described, an indexible turret, a rotatable mandrel carried by the turret, means for indexing the turret to successive stations and for rotating the mandrel at each station, means for feeding a strip of material to the mandrel at one station, means associated with said station for simultaneously laying down and adhesively treating said strip as it is being wound on the mandrel, means for feeding a strip of material to said mandrel when indexed at the second station, means for adhesively treating said strip prior to the winding thereon, and means associated with said mandrel at the second station for first wiping said second strip into engagement with said first strip and then laying down said second strip during the winding thereon.

17. In a machine of the character described, a rotatable mandrel, means for intermittently rotating said mandrel, means for intermittently feeding a strip of material to said mandrel, means for supplying a strip of material to said feed means, comprising a driven roll and an idler roll, pressure means for maintaining said idler roll in contact with said driven roll, and means for varying the transverse pressure of said idler roll to adjust the transverse position of the strip.

18. In a machine of the character described, a rotatable turret, a plurality of mandrels carried by said turret, means for indexing said turret and for rotating said mandrel when the turret is indexed, an ejector collar carried on each mandrel and adapted to be transversely moved thereon, and ejection means comprising a follower adapted to be moved toward ejecting position during rotation of the mandrel and back to station during indexing of the turret, an ejecting plate pivotally mounted on the follower and having a free end engaging in a collar, said plate being of such length as to maintain engagement with an ejecting collar until aligned with the next successive collar.

19. In a machine of the character described, a rotatable mandrel, means for intermittently rotating the mandrel, auxiliary means associated with said mandrel for supplying a strip of material thereon, means for normally securing said auxiliary means out of operation, and manually operable means for rendering said auxiliary securing means inoperative.

20. In a machine of the character described, a mandrel, means for positioning the leading edge of a strip of material on said mandrel to be wound thereon; an adhesive treating device, means for positioning an adhesive treating device on the leading edge of said strip, and means for then rotating the mandrel to wind the strip thereon whereby said entire strip from the leading edge will be adhesively treated.

21. In a machine of the character described, a non-circular mandrel, means for positioning the leading edge of a strip of material on said mandrel to be wound thereon, an adhesive treating device, means for positioning an adhesive treating device on the leading edge of said strip, and means for then rotating the mandrel to wind the strip thereon whereby said entire strip from the leading edge will be adhesively treated.

22. In a machine of the character described, a rotatable turret, a mandrel carried on said turret, means for indexing said turret and for rotating said mandrel when said turret is indexed and for providing a dwell between each indexing of the turret and each rotation of the mandrel, feed means for positioning the leading edge of a strip of material on the mandrel during a dwell, means at one station for positioning an adhesive supplying device on the leading edge of the strip during the dwell and maintaining same in contact with the strip as it is withdrawn from the feeding means, means for supplying a second strip of material to the mandrel during the dwell after indexing to another station, and means for adhesively treating the outer face of the second strip prior to its being positioned on the mandrel.

23. In a machine of the character described, a mandrel, a lay-down roll associated with said mandrel, means for moving said roll into contact with said mandrel, and means for supporting said lay-down roll on said last-mentioned means whereby said roll will initially move relative to the mandrel and then remain in fixed position relative thereto.

24. In a machine of the character described, a rotatable mandrel, means for feeding a strip of paper to said mandrel to be wound thereon, means for cutting said strip after a predetermined length has been wound thereon, latching means normally holding said cutting means in open position, means for releasing said latching means, and means for adjusting said releasing means whereby the predetermined length of paper to be wound thereon may be varied.

ALEXANDER G. HATCH.
ROBERT S. CONDON.